(12) United States Patent
Kumagai et al.

(10) Patent No.: US 9,571,794 B2
(45) Date of Patent: Feb. 14, 2017

(54) SURVEYING APPARATUS

(71) Applicant: Kabushiki Kaisha TOPCON, Itabashi-ku, Tokyo-to (JP)

(72) Inventors: Kaoru Kumagai, Tokyo-to (JP); Kazuki Osaragi, Tokyo-to (JP); Tetsuji Anai, Tokyo-to (JP); Fumio Ohtomo, Asaka (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 656 days.

(21) Appl. No.: 13/718,358

(22) Filed: Dec. 18, 2012

(65) Prior Publication Data
US 2013/0155225 A1 Jun. 20, 2013

(30) Foreign Application Priority Data

Dec. 19, 2011 (JP) .................................. 2011-277661
Dec. 27, 2011 (JP) .................................. 2011-286476

(51) Int. Cl.
*H04N 7/18* (2006.01)
*G01C 15/00* (2006.01)
*G02B 23/00* (2006.01)

(52) U.S. Cl.
CPC .............. *H04N 7/18* (2013.01); *G01C 15/002* (2013.01); *G02B 23/145* (2013.01)

(58) Field of Classification Search
CPC .......... G01C 15/002; G01C 15/00; G01C 1/04
(Continued)

(56) References Cited

U.S. PATENT DOCUMENTS 4,643,556 A * 2/1987 Fujiwara ................ G02B 7/282
 348/345
5,389,774 A * 2/1995 Gelman ................. G01M 11/02
 250/201.1
(Continued)

FOREIGN PATENT DOCUMENTS

JP 3-239942 A 10/1991
JP 9-113356 A 5/1997
(Continued)

OTHER PUBLICATIONS

Extended European Search Report completed Nov. 18, 2013 in corresponding European patent application No. EP 12197886.0.

*Primary Examiner* — Christopher S Kelley
*Assistant Examiner* — Deirdre Beasley
(74) *Attorney, Agent, or Firm* — Nields, Lemack & Frame, LLC

(57) ABSTRACT

A surveying apparatus comprises an observation optical system having an image sensor for outputting a digital image signal and a zoom optical system, a reference-pattern projection optical system for making a reference pattern enter the observation optical system in an infinity state and for forming an image on the image sensor, a rotation mechanism capable of rotating in two directions, a horizontal angle detector and a vertical angle detector for detecting a horizontal angle and a vertical angle of rotation in the two directions of the rotation mechanism, and an arithmetic control unit. The arithmetic control unit measures the horizontal angle and the vertical angle of a sighting point based on detection results of the horizontal angle detector and the vertical angle detector and based on a difference between the reference pattern on the image sensor and the sighting point of the observation optical system.

8 Claims, 6 Drawing Sheets

(58) Field of Classification Search
USPC ........................................................ 348/137
See application file for complete search history.

(56) References Cited

U.S. PATENT DOCUMENTS

| | | | | |
|---|---|---|---|---|
| 6,226,035 | B1* | 5/2001 | Korein | G02B 13/06 348/335 |
| 6,473,166 | B1* | 10/2002 | Ohishi | G01C 15/002 356/141.1 |
| 7,081,917 | B2 | 7/2006 | Shimoyama et al. | |
| 7,515,256 | B2* | 4/2009 | Ohtomo | G01C 15/002 356/141.1 |
| 2002/0138997 | A1 | 10/2002 | Ohtomo et al. | |
| 2003/0048355 | A1* | 3/2003 | Shimoyama | G01C 15/00 348/79 |
| 2004/0246468 | A1* | 12/2004 | Ohtomo | G01C 15/00 356/139.1 |
| 2007/0081146 | A1* | 4/2007 | Kumagai | G01C 9/06 356/139.1 |
| 2007/0171288 | A1* | 7/2007 | Inoue | G06T 1/0064 348/241 |
| 2008/0069406 | A1* | 3/2008 | Matsuo | G06K 9/00771 382/106 |
| 2009/0002510 | A1* | 1/2009 | Uchihashi | H04N 17/00 348/222.1 |
| 2009/0119050 | A1 | 5/2009 | Hayashi | |
| 2009/0171610 | A1* | 7/2009 | Haijima | G01C 15/002 702/95 |
| 2010/0026878 | A1* | 2/2010 | Seo | G02B 15/173 348/345 |
| 2010/0079626 | A1* | 4/2010 | Hatakeyama | G06T 5/006 348/241 |
| 2010/0209090 | A1* | 8/2010 | Kludas | G01C 3/08 396/89 |
| 2011/0193997 | A1* | 8/2011 | Hatakeyama | H04N 5/3572 348/241 |
| 2011/0310125 | A1* | 12/2011 | McEldowney | G06F 3/017 345/660 |

FOREIGN PATENT DOCUMENTS

| | | |
|---|---|---|
| JP | 2002-286450 A | 10/2002 |
| JP | 2003-5004 A | 1/2003 |
| JP | 2003-083746 A | 3/2003 |
| JP | 2003-130644 A | 5/2003 |
| JP | 2007-322407 A | 12/2007 |
| JP | 2008-241529 A | 10/2008 |
| JP | 2009-109458 A | 5/2009 |
| JP | 2009-156773 A | 7/2009 |
| JP | 2010-286281 A | 12/2010 |
| JP | 2011-242315 A | 12/2011 |
| WO | 2009/109202 A1 | 9/2009 |

* cited by examiner

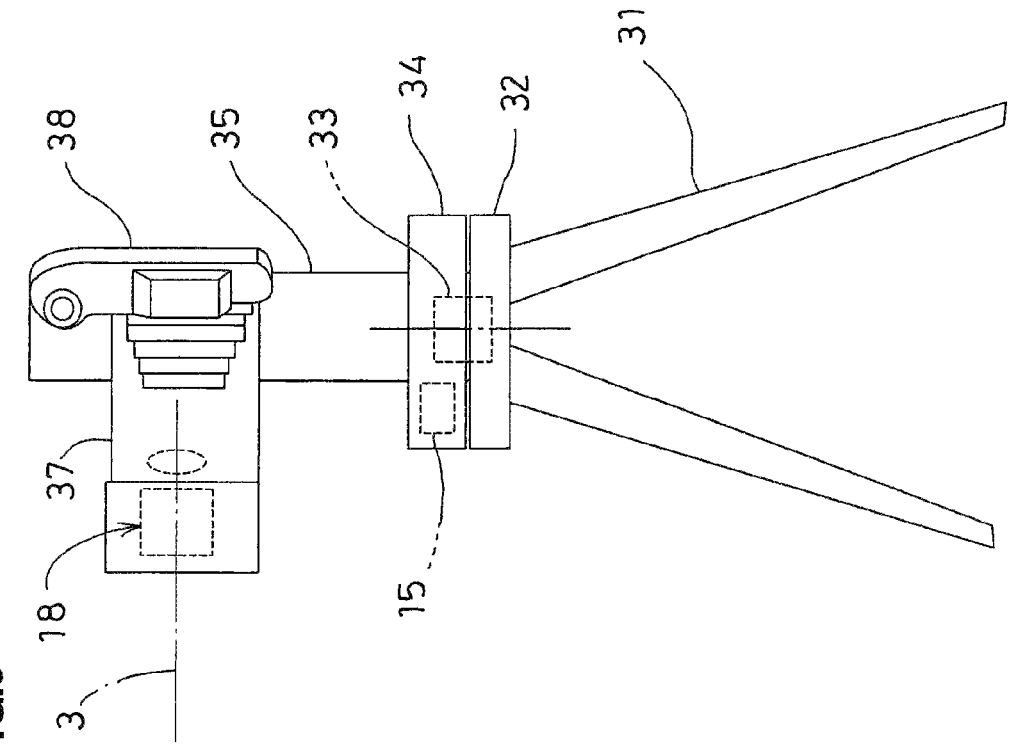
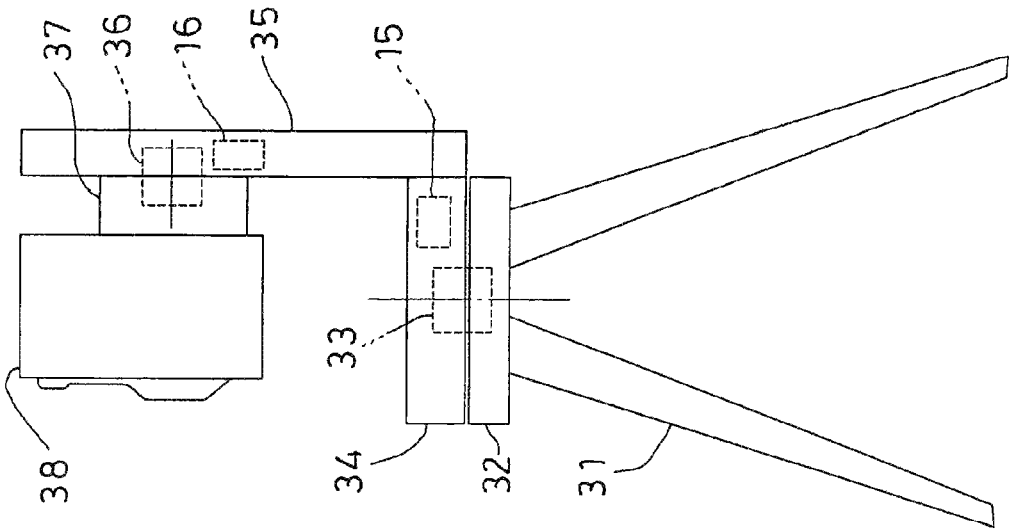

SURVEYING APPARATUS

BACKGROUND OF THE INVENTION

The present invention relates to a surveying apparatus in which an observation optical system is provided with a zoom function.

A surveying apparatus, for instance, a sighting telescope used in a total station or the like has a high power of approximately 30-power and has a problem that it is difficult to perform sighting on a measuring point with a sighting telescope from the beginning. Therefore, in the past, the sighting is performed on the measuring point first visually or by using a sighting device and then, the sighting is performed on the measuring point with the sighting telescope. However, since the visual sighting, the sighting device and the sighting telescope are largely different in power and even if the sighting is performed on the measuring point visually or by using the sighting device, to catch the measuring point in a field of view of the sighting telescope.

Moreover, by providing the zoom function in the telescope, in a state where the measuring point is observed by the telescope, it is possible to change the power but the zoom mechanism is structurally poor in stability of an optical axis and it is difficult to keep a sighting position and thus, the zoom mechanism has not been used in the surveying apparatus, particularly in the total station.

SUMMARY OF THE INVENTION

It is an object of the present invention to provide a surveying apparatus in which a zoom function can be provided in an observation optical system.

To attain the above object, a surveying apparatus according to the present invention comprises an observation optical system having an image sensor for outputting a digital image signal and a zoom optical system, a reference-pattern projection optical system for making a reference pattern enter the observation optical system in an infinity state and for forming an image on the image sensor, a rotation mechanism capable of rotating the observation optical system and the reference-pattern projection optical system integrally in two directions of horizontal and vertical, a horizontal angle detector and a vertical angle detector for detecting a horizontal angle and a vertical angle of rotation in the two directions of the rotation mechanism, and an arithmetic control unit, and in the surveying apparatus, the arithmetic control unit measures the horizontal angle and the vertical angle of a sighting point based on detection results of the horizontal angle detector and the vertical angle detector and based on a difference between the reference pattern on the image sensor and the sighting point of the observation optical system.

Further, the surveying apparatus according to the present invention further comprises an electro-optical distance measurement instrument having a distance measuring optical axis in parallel with an optical axis of the observation optical system, and in the surveying apparatus, the electro-optical distance measurement instrument measures a distance of a measuring point of an object to be measured.

Further, the surveying apparatus according to the present invention further comprises a fine adjustment mechanism which is provided on the distance measuring optical axis and finely adjusts a deflection of the distance measuring optical axis, and in the surveying apparatus, the fine adjustment mechanism is configured to make the measuring point of a distance measurement concur with a measuring point of the observation optical system.

Further, in the surveying apparatus according to the present invention, the reference pattern is a lattice composed of orthogonal lines and a zoom power is calculated by measuring a line interval of the lattice projected on the image sensor.

Further, in the surveying apparatus according to the present invention, the reference pattern is a lattice composed of orthogonal lines, a distortion of an image is calculated by measuring the lattice projected on the image sensor and based on a calculation result, a measurement result is corrected.

Further, in the surveying apparatus according to the present invention, the observation optical system is a commercial digital camera.

According to the present invention, the surveying apparatus comprises an observation optical system having an image sensor for outputting a digital image signal and a zoom optical system, a reference-pattern projection optical system for making a reference pattern enter the observation optical system in an infinity state and for forming an image on the image sensor, a rotation mechanism capable of rotating the observation optical system and the reference-pattern projection optical system integrally in two directions of horizontal and vertical, a horizontal angle detector and a vertical angle detector for detecting a horizontal angle and a vertical angle of rotation in the two directions of the rotation mechanism, and an arithmetic control unit, and in the surveying apparatus, the arithmetic control unit measures the horizontal angle and the vertical angle of a sighting point based on detection results of the horizontal angle detector and the vertical angle detector and based on a difference between the reference pattern on the image sensor and the sighting point of the observation optical system. As a result, the power can be changed by the zoom optical system, and the sighting is facilitated, and moreover, even if the optical axis of the observation optical system is shifted, an accurate angle measurement including the shift can be made.

Further, according to the present invention, the surveying apparatus further comprises an electro-optical distance measurement instrument having a distance measuring optical axis in parallel with an optical axis of the observation optical system, and in the surveying apparatus, the electro-optical distance measurement instrument measures a distance of a measuring point of an object to be measured. As a result, a simple total station provided with a zoom function can be configured.

Further, according to the present invention, the surveying apparatus, further comprises a fine adjustment mechanism which is provided on the distance measuring optical axis and finely adjusts a deflection of the distance measuring optical axis, and in the surveying apparatus, the fine adjustment mechanism is configured to make the measuring point of a distance measurement concur with a measuring point of the observation optical system. As a result, a distance measurement and an angle measurement can be performed with accuracy.

Further, according to the present invention, in the surveying apparatus, the reference pattern is a lattice composed of orthogonal lines and a zoom power is calculated by measuring a line interval of the lattice projected on the image sensor. As a result, an accurate measurement considering the power can be made.

Further, according to the present invention, in the surveying apparatus, the reference pattern is a lattice composed of orthogonal lines, a distortion of an image is calculated by measuring the lattice projected on the image sensor and based on a calculation result, a measurement result is corrected. As a result, an accurate measurement can be made.

Furthermore, according to the present invention, in the surveying apparatus, the observation optical system is a commercial digital camera. As a result, the surveying apparatus can be configured inexpensively and simply.

BRIEF DESCRIPTION OF THE DRAWINGS

FIG. 6 is a front view of a third embodiment.

FIG. 7 is a front side view of the third embodiment.

DETAILED DESCRIPTION OF THE PREFERRED EMBODIMENTS

By referring to the attached drawings, description will be given below on an embodiment of the present invention.

Figure 1:
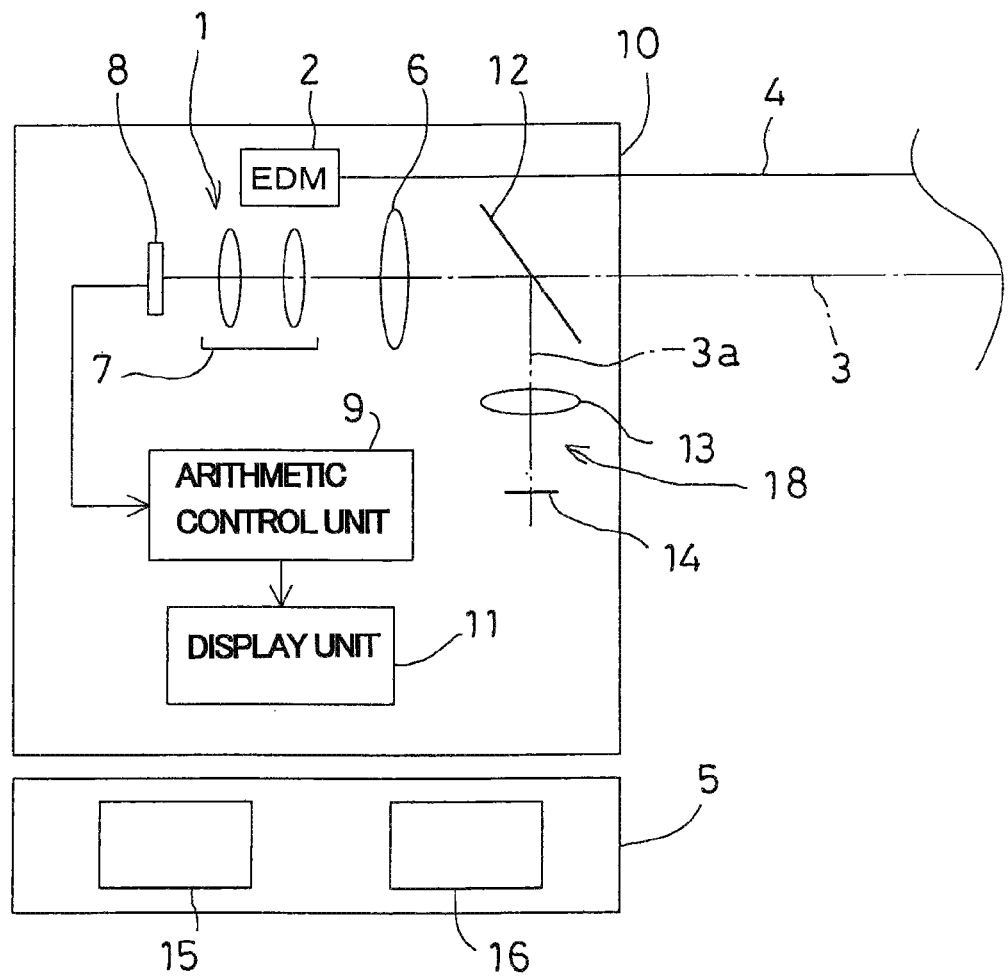
FIG. 1 is a schematical block diagram of a surveying apparatus according to a first embodiment of the present invention.

FIG. 1 shows a basic configuration of a surveying apparatus according to a first embodiment of the present invention. In FIG. 1, reference numeral 1 shows an observation optical system, and reference numeral 2 shows an Electro-Optical Distance Measurement instrument (EDM).

The observation optical system 1 has an observation optical axis 3, the electro-optical distance measurement instrument 2 has a distance measuring optical axis 4. The observation optical axis 3 and the distance measuring optical axis 4 are parallel with each other and the observation optical system 1 and the electro-optical distance measurement instrument 2 are installed so that an interval between the observation optical axis 3 and the distance measuring optical axis is known. Moreover, the observation optical system 1 and the electro-optical distance measurement instrument 2 are mechanically integrated and constitute a measuring unit 10, and the measuring unit 10 is supported rotatably in two directions, that is, the horizontal direction and the vertical direction by a rotation mechanism 5.

The observation optical system 1 has an objective lens 6, a zoom optical system 7, and an image sensor 8 on the observation optical axis 3, and the image sensor 8 is provided at a focus position of the zoom optical system 7.

As the image sensor 8, a CCD, a CMOS sensor or the like composed of an aggregation of a large number of pixels is used. Each pixel produces a photodetection signal and based on the produced signal, the position of the image sensor 8 can be specified.

An output signal from the image sensor 8 is a collection of the output signals from the pixels and is outputted to an arithmetic control unit 9 as a digital image signal.

In relation with the objective lens 6 on the observation optical axis 3, an optical-path splitting optical member, a half mirror 12, for example, is disposed on the article side. The observation optical axis 3 transmits through the half mirror 12, a condenser lens 13 is disposed on a reflective optical axis 3a of the half mirror 12, and a reference pattern 14 is disposed at a focus position of the condenser lens 13.

Figure 2:
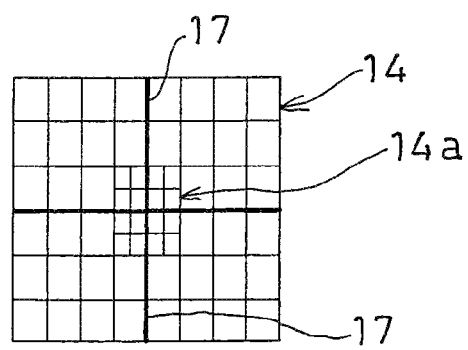
FIG. 2 is a diagram to show an example of a reference line used in the first embodiment.

The reference pattern 14 is a configuration (figure) with which a reference position, a power, and a distortion of an image can be detected and for example, the reference pattern 14 is a lattice configured by vertical and horizontal orthogonal lines as illustrated in FIG. 2 and in the reference pattern 14, a bold reference line 17 orthogonal at the center is provided. Further, the reference pattern 14 has a fine pattern 14a in which a grid of the lattice is set smaller than the peripheral grid at a predetermined power (one side is ½ times in the figure).

By setting the reflective optical axis 3a such that its position is not mechanically changed (fixed to a known relationship) with respect to a rotation shaft (horizontal rotation shaft and vertical rotation shaft) (not shown) of the rotation mechanism 5, the position of the reference pattern 14 on the image sensor 8 reflects a mechanical position and attitude of the surveying apparatus. Here, the half mirror 12, the condenser lens 13, and the reference pattern 14 constitute a reference-pattern projection optical system 18 which projects the reference pattern 14 onto the observation optical system 1 in an infinity state.

The rotation mechanism 5 comprises a horizontal angle detector 15 and a vertical angle detector 16 for each of the horizontal rotation shaft and the vertical rotation shaft, and the horizontal angle detector 15 and the vertical angle detector 16 detect a horizontal rotation angle and a vertical rotation angle of the measuring unit 10, respectively.

The electro-optical distance measurement instrument 2 projects a distance measuring light onto the distance measuring optical axis 4, receives a reflection light from the object to be measured and measures a distance to a point (measuring point) projected by the distance measuring light based on a photodetection result. The distance measuring light may be either of a visible light and a non-visible light but if the visible light is used, the measuring point during the measurement can be checked visually or on an image.

The arithmetic control unit 9 is configured to display an image taken by the image sensor 8 on a display unit 11. Moreover, the arithmetic control unit 9 processes an image signal from the image sensor 8 and extracts the reference pattern 14. One of the methods for extracting the reference pattern 14 is to acquire an image without the reference pattern 14 and next, to acquire an image with the reference pattern 14 and to take the difference between the both images, and as a result, the reference pattern 14 can be extracted.

Moreover, the arithmetic control unit 9 calculates a horizontal angle and a vertical angle of the measuring point based on a detection signal from the horizontal angle detector 15 and the vertical angle detector 16 and the image signal from the half mirror 12 and the image sensor 8.

An action of the surveying apparatus of the above-described configuration will be described.

Since the reference pattern 14 is located at a focus of the condenser lens 13, a light from the reference pattern 14 becomes a parallel light by passing through the condenser lens 13 and forms an image on the image sensor 8. In a state where the observation optical axis 3 and the reflective optical axis 3a completely match each other, the center of the reference pattern 14 concurs with the center of the image sensor 8. Moreover, the reference pattern 14 is projected in accordance with the power of the zoom optical system 7, and a position (coordinate) of a point on the reference pattern 14 is specified at the position according to the power of the zoom optical system 7.

Moreover, in a case where the observation optical axis 3 is tilted with respect to the reflective optical axis 3a, the reference pattern 14 is projected onto the image sensor 8 with displacement of only a tilting angle of the observation optical axis 3. Furthermore, since the reflective optical axis 3a is fixed to a known relationship with respect to the rotation shaft (horizontal rotation shaft and vertical rotation shaft) of the rotation mechanism 5, by detecting the displacement of the reference pattern 14 on the image sensor 8, the tilting of the observation optical axis 3 can be detected.

Furthermore, by referring to FIG. 3A to FIG. 3C, description will be given on a change in an image in the case of zooming with the observation optical system 1, a state of the measuring point within the image, and a measurement of the horizontal angle and the vertical angle by the observation optical system 1.

Figure 3A:
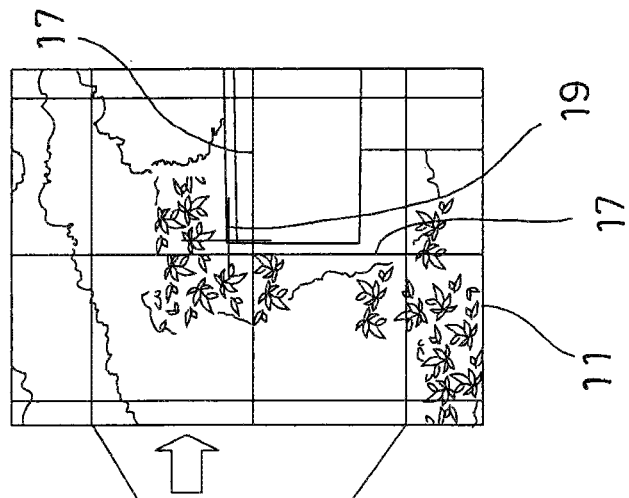
FIG. 3A, FIG. 3B, and FIG. 3C are explanatory drawings to show a change of an image when zooming is executed by an observation optical system of the first embodiment and a state of a measuring point in the image.

In a state where the zoom power is set low (2-power, for example) in the observation optical system 1, the observation optical axis 3 is directed toward the measuring point of the object to be measured, and the image of a wide angle including the object to be measured is displayed on the display unit 11 (See FIG. 3A).

On the display unit 11, the image taken by the image sensor 8 is displayed and the reference pattern 14 is displayed in a state overlapped with the image. The reference pattern 14 may be in color different from the color of the background and may be further configured to flash for ease of discrimination. The center of the reference pattern 14 (point where the reference line 17 intersects) indicates the measuring point.

The direction of the measuring unit 10, that is, the direction of the observation optical axis 3 is adjusted by the rotation mechanism 5 so that the center of the reference pattern 14 is matched with the measuring point, that is, the measuring point comes to the center of the image. The direction of the observation optical axis 3 is measured by the horizontal angle detector 15 and the vertical angle detector 16.

Figure 3B:
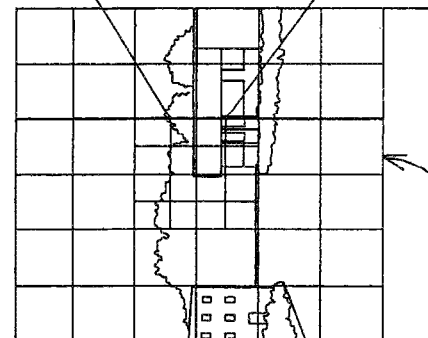
Figure 3C:
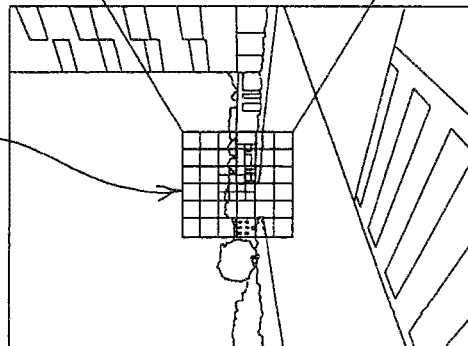

By raising the zoom power in steps or continuously by the zoom optical system 7, observation of the object to be measured is facilitated (See FIG. 3B and FIG. 3C). Moreover, a measurement index 19 for specifying the measuring point is displayed on the image other than the reference pattern line. This measurement index 19 can be displayed at a desired position on the screen by an operation from the outside.

By raising the zoom power by the zoom optical system 7, the reference pattern 14 reflected on the observed image and the observed image itself are integrally enlarged. At this time, even if the observation optical axis 3 is shifted, since the observed image and the reference pattern 14 are integrally shifted, the relationship between the observed image and the reference pattern 14 on the observed image is not affected. Therefore, by measuring the measurement index 19 on the image with the reference pattern 14 as a reference, the horizontal direction and the vertical direction are corrected, and a measurement error caused by the shift can be eliminated.

Figure 4:
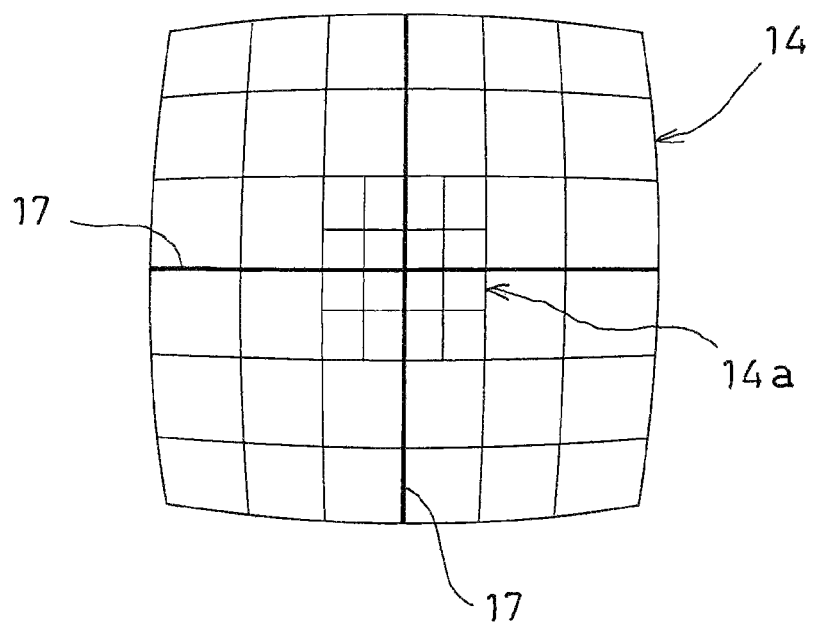
FIG. 4 is an explanatory drawing to show a state where a reference pattern is distorted during zooming.

In the optical system in general, a distortion is caused in an image caused by the lens distortion as illustrated in FIG. 4, and correction is needed in the measurement. In this case, by measuring the vertical lines and the lateral lines of the lattice constituting the reference pattern 14 by the image sensor 8, the state of distortion of the vertical lines and the lateral lines can be measured, and based on the measurement result, the measured value can be corrected. Alternatively, a measurement is made based on the distorted lines as a reference. In either case, the distortion according to the power can be measured by the reference pattern 14, and a highly accurate measurement not affected by the lens distortion can be made.

A distance measurement for the measuring point is executed by the electro-optical distance measurement instrument 2. Moreover, by using a visible light for the distance measurement light, the distance measurement position can be checked on the image. The distance measuring optical axis 4 and the observation optical axis 3 are in parallel with each other and spaced away at the known interval, and though the measuring point is not measured accurately, a shift between the measuring point and the electro-optical distance measurement instrument 2 is slight, and the distance measurement result measured by the electro-optical distance measurement instrument 2 can be practically used as the measured distance of the measuring point.

Thus, a total station having the zoom function in which the sighting of the measuring point can be facilitated. In the first embodiment, a commercial hand held type may be attached for the electro-optical distance measurement instrument 2 or the electro-optical distance measurement instrument 2 may be omitted and the surveying apparatus may be used for measuring an angle.

Next, when a panoramic image for a measurement to be created by using the observation optical system 1, the reference pattern 14 can be used.

If the panoramic image for a measurement is to be created, a taken image around the rotation center of shooting is needed, but the taken image acquired by a camera is an image around a lens principal point and not an image around the rotation center. As a result, it was necessary to determine a relationship with the rotation center and to separately reconfigure the image from the relationship between the lens principal point and the rotation center. As described above, by using the zoom function, the lens principal point is changed, and the relationship between the lens principal point and the rotation center cannot be specified. As a result, the panoramic image could not be created with the observation optical system 1 using the zoom function.

In the present embodiment, the reference pattern is an image around the rotation center regardless of the zoom function, and the image using the reference pattern as a scale becomes an image around the rotation center and creation of the panoramic image for a measurement is facilitated.

Figure 5:
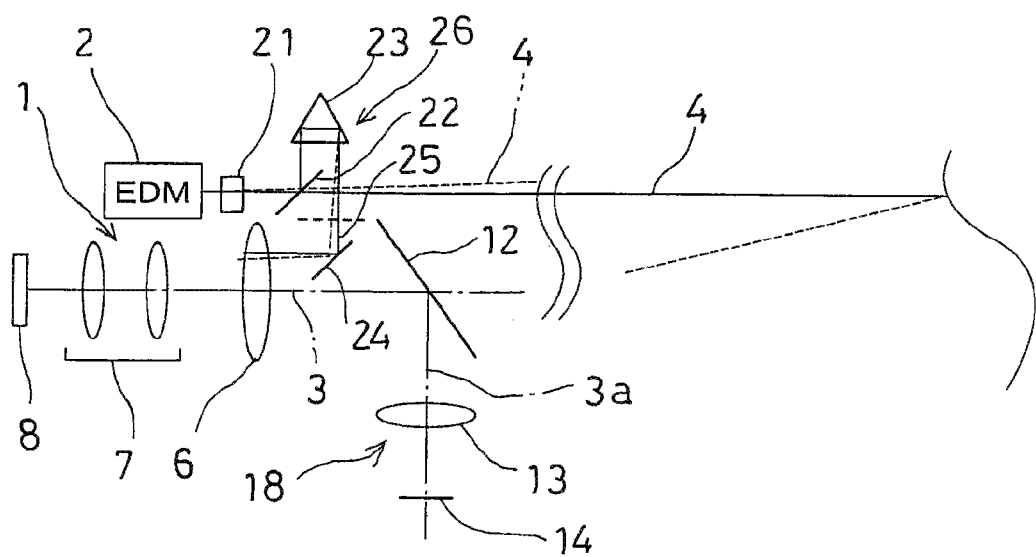
FIG. 5 is a schematical diagram to show an optical system of a second embodiment.

FIG. 5 illustrates a basic configuration of a surveying apparatus according to a second embodiment.

In the second embodiment, the distance measurement accuracy is further improved. In the second embodiment, the portions similar to portions in the first embodiment are omitted and only an optical system is illustrated.

In the second embodiment, a fine adjustment mechanism 21 of a distance measuring optical axis 4 is provided. As one example of the fine adjustment mechanism 21, the one composed of a pair of wedge prisms can be cited. By relatively rotating each prism in the pair of wedge prisms, the deflection of the distance measuring optical axis 4 can be finely adjusted.

A half mirror 22 is disposed on the distance measurement optical axis 4 having passed the fine adjustment mechanism 21, a corner prism 23 is arranged opposite to the half mirror 22, and further, a mirror 24 which is opposite to the corner prism 23 and makes a reflection light from the corner prism 23 enter an observation optical system 1 is provided. A visible light is preferably used as the distance measuring light.

A part of the distance measuring light emitted from an electro-optical distance measurement instrument 2 is split by the half mirror 22, and a part of the split distance measuring light enters the corner prism 23 as a monitor light 25 and is reflected in parallel with an incident light by the corner prism 23, and the monitor light 25 reflected by the corner prism 23 is further reflected in parallel with the distance measuring optical axis 4 by the mirror 24 and enters the observation optical system 1. Moreover, the monitor light 25 entered the observation optical system 1 is received by an image sensor 8.

The half mirror 22, the corner prism 23, and the mirror 24 constitute a distance measuring optical axis monitor optical system 26.

The direction of the distance measuring optical axis 4 can be finely adjusted by the fine adjustment mechanism 21, and the position measured by the electro-optical distance measurement instrument 2 can be made to concur with the position measured by the observation optical system 1. Therefore, the measuring point whose angle is measured and the measuring point whose distance is measured can be made to match each other, and the measurement accuracy can be further improved.

Moreover, the distance measuring optical axis monitor optical system 26 makes the monitor light 25 enter the observation optical system 1 while reflecting a state of the distance measuring optical axis 4 adjusted by the fine adjustment mechanism 21. Therefore, by the fact that the image sensor 8 receives the monitor light 25, an projection position (measuring point) of the distance measuring light can be determined on the image.

FIG. 6 and FIG. 7 illustrate a third embodiment. In the third embodiment, a commercial digital camera is used as an observation optical system having a zoom optical system and a transit is constituted.

In FIG. 6 and FIG. 7, same component as shown in FIG. 1 is referred by the same symbol, and detailed description is not given here.

A leveling unit 32 is provided on an upper end of a tripod 31, and a rotation base 34 is rotatably provided on the leveling unit 32 via a horizontal rotation shaft 33. The leveling unit 32 has a leveling mechanism (not shown) for leveling a center line of the horizontal rotation shaft 33 to vertical. Inside the rotation base 34, a horizontal rotation driving unit (not shown) is accommodated, and by means of the horizontal rotation driving unit, the rotation base 34 is rotated around the horizontal rotation shaft 33.

On the rotation base 34, a mount 35 is provided perpendicularly. On the mount 35, a vertical rotation base 37 extending in the horizontal direction is provided, and the vertical rotation base 37 can rotate via a vertical rotation shaft 36 having a horizontal center line. In the mount 35, a vertical rotation driving unit (not shown) is accommodated, and the vertical rotation base 37 is rotated in the vertical direction around the vertical rotation shaft 36 by the vertical rotation driving unit.

A digital camera 38 is attached to the vertical rotation base 37, and the digital camera 38 has a zoom mechanism. Moreover, the digital camera 38 has an observation optical axis 3, and the observation optical axis 3 is configured to rotate in the vertical direction by rotation of the vertical rotation base 37. The observation optical axis 3 is configured to cross the center line of the horizontal rotation shaft 33 and to rotate in a vertical plane including the center line of the horizontal rotation shaft 33.

With respect to the observation optical axis 3, a reference-pattern projection optical system 18 is provided. The reference-pattern projection optical system 18 has a reflective optical axis $3a$ as described above (See FIG. 1), and the reflective optical axis $3a$ has a mechanically fixed relationship with respect to the center line of the horizontal rotation shaft 33 and the center line of the vertical rotation shaft 36, and a rotation amount of the horizontal rotation shaft 33 matches the horizontal rotation angle of the reflective optical axis $3a$, and the rotation amount of the vertical rotation shaft 36 matches the vertical rotation angle of the reflective optical axis $3a$.

Regarding the horizontal rotation shaft 33 and the vertical rotation shaft 36, a horizontal angle detector 15 and a vertical angle detector 16 are provided, and rotation angles of the horizontal rotation shaft 33 and the vertical rotation shaft 36 are detected by the horizontal angle detector 15 and the vertical angle detector 16. General encoders may be used for the horizontal angle detector 15 and the vertical angle detector 16, but in the present embodiment, angle detector built in the horizontal rotation shaft 33 and the vertical rotation shaft 36 are used.

Figure 8A:
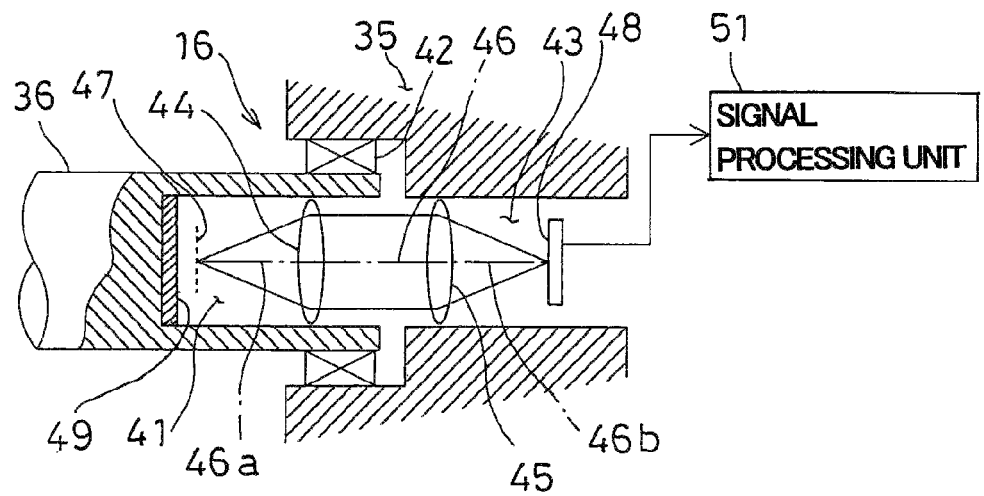
FIG. 8A is a cross-sectional view to show a vertical angle detector used in the third embodiment.

Since the horizontal angle detector 15 and the vertical angle detector 16 have the same structure, the vertical angle detector 16 will be described below by referring to FIG. 8.

On an end portion of the vertical rotation shaft 36, a cylindrical shaft portion space 41 is formed concentrically with the center line of the vertical rotation shaft 36, and a shaft end portion has a hollow structure. The shaft end portion is freely rotatably supported by the base 35 through a bearing 42, a bearing holder space 43 is formed concentrically with the shaft portion space 41 on the mount 35, and the bearing holder space 43 and the shaft portion space 41 have the same diameter. Major constituent elements of the vertical angle detector 16 are accommodated in the shaft portion space 41 and the bearing holder space 43.

A first condenser lens 44 is provided in the shaft portion space 41, and a second condenser lens 45 is provided in the bearing holder space 43. Each power of the first condenser lens 44 and the second condenser lens 45 is one-power, respectively, and the lenses have the same focal length.

The first condenser lens 44 and the second condenser lens 45 have optical axes $46a$ and $46b$, respectively, and the optical axis $46a$ concurs with the center line of the vertical rotation shaft 36, and the optical axis $46b$ concurs with the center line of the bearing holder space 43. Therefore, if in a state where there is no tilting in the vertical rotation shaft 36, the optical axis $46a$ and the optical axis $46b$ concur with each other on the same straight line.

The first condenser lens 44 and the second condenser lens 45 preferably have the same characteristics so that a distortion is not generated in an image.

On a bottom portion of the shaft portion space 41, an angle detection pattern 47 is provided, and the angle detection pattern 47 is located at the focal position of the first condenser lens 44. Moreover, in the bearing holder space 43, a shaft portion image sensor 48 is provided, and the shaft portion image sensor 48 is located at a focal position of the second condenser lens 45.

At appropriate spot in the bearing holder space 43 or the shaft portion space 41, a light emitting unit for illuminating the angle detection pattern 47 is provided. In the illustrated example, a ring-shaped light emitting unit 49 provided on the bottom portion of the shaft portion space 41 and surrounding the periphery of the angle detection pattern 47 is illustrated as an example.

As the shaft portion image sensor 48, a CCD or a CMOS sensor or the like which is an aggregation of pixels is used, and a position of each pixel can be specified on the shaft portion image sensor 48. Moreover, a photodetection signal from the shaft portion image sensor 48 is inputted into a signal processing unit 51, and the signal processing unit 51 is configured to measure a rotation angle and a tilting (a tilting angle) of the vertical rotation shaft 36 based on the photodetection signal.

Figure 9:
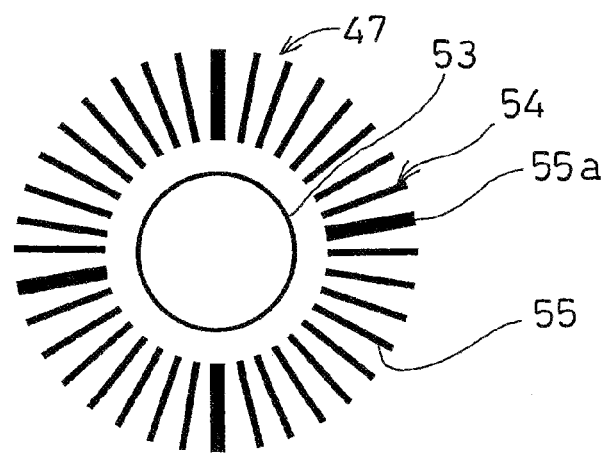
FIG. 9 is an explanatory drawing to show an example of an angle detection pattern used in the vertical angle detector.

FIG. 9 illustrates an example of the angle detection pattern 47.

A basic shape of the angle detection pattern 47 is a circle and the center of the angle detection pattern 47 concurs with the optical axis of the first condenser lens 44, that is, the optical axis 46a.

The angle detection pattern 47 is composed of a circular pattern 53 for centering at the center part and a reference pattern 54 disposed around a periphery of the circular pattern 53. The circular pattern 53 is a perfect circle drawn with a predetermined line width.

The reference pattern 54 has a configuration in which line segments 55 extending in a radial direction are arranged on a total circumference at a predetermined angular pitch, and a ring-shaped track is formed by the line segments 55. Among the line segments 55, line segments 55a at predetermined plural positions are thicker than the others. Inner ends and outer ends of the line segments 55 are configured to be located on the circumference concentrically with the circular pattern 53, respectively. Moreover, the line segments 55a are not provided at positions equally dividing the circumference as illustrated in the figure, and by detecting the position of the line segment 55a, a rotation angle of the reference pattern 54 can be detected.

An action of the above-described vertical angle detector 16 will be described below.

The angle detection pattern 47 is projected onto the shaft portion image sensor 48 by an action of the first condenser lens 44 and the second condenser lens 45 with a relationship of 1:1, and the shaft portion image sensor 48 produces a signal corresponding to the angle detection pattern 47 as received.

If the vertical rotation shaft 36 rotates, the angle detection pattern 47 also rotates integrally with the vertical rotation shaft 36, and a rotated image of the angle detection pattern 47 is projected onto the shaft portion image sensor 48. Since the shaft portion image sensor 48 produces a photodetection signal for each pixel, for example, if the line segment 55a moves, the position of the pixel receiving the line segment 55a changes. Therefore, based on the signal from the shaft portion image sensor 48, by detecting a position change of the pixel receiving the line segment 55a, the rotation angle of the vertical rotation shaft 36 with respect to the mount 35 can be detected.

Figure 8B:
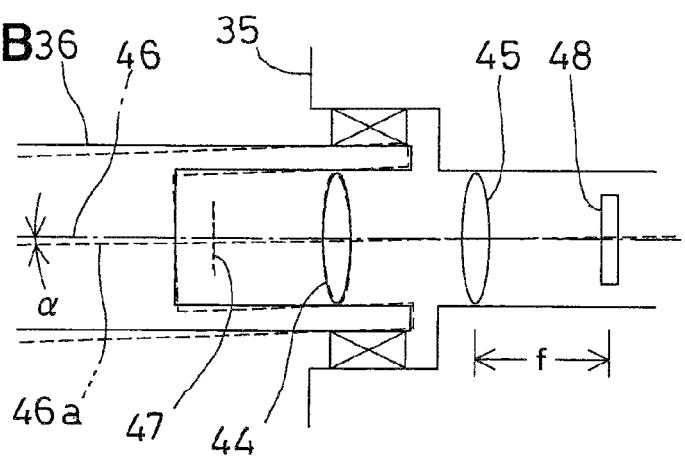
FIG. 8B is an explanatory diagram when a rotation shaft is tilted.

Next, description will be given on a case where the vertical rotation shaft 36 is tilted with respect to the mount 35 by referring to FIG. 8B.

By the action of the first condenser lens 44 and the second condenser lens 45, a light beam entering the first condenser lens 44 is projected by the second condenser lens 45 onto the shaft portion image sensor 48 in parallel with the light beam. If the optical axis 46a of the first condenser lens 44 is tilted with respect to the optical axis 46b of the second condenser lens 45, the image of the angle detection pattern 47 projected onto the shaft image sensor 48 is projected onto the shaft portion image sensor 48 from a direction of the tilting only by a tilting of the optical axis 46a of the first condenser lens 44. Therefore, the projected image is displaced only by a portion corresponding to the tilting on the shaft portion image sensor 48.

Here, assuming that a displacement amount of the pattern image on the shaft portion image sensor 48 is $\Delta$, a tilting of the optical axis 46a of the first condenser lens 44 is $\alpha$, and a focal point of the second condenser lens 45 is f, $\tan \alpha = \Delta/f$. Moreover, the center of the circular pattern 53 indicates the center of the angle detection pattern 47, and by detecting the position of each pixel of the shaft portion image sensor 48 receiving the circular pattern 53, the center of the circular pattern 53 can be determined, and by determining a deviation between the center of the circular pattern 53 and the center of the shaft portion image sensor 48, the displacement amount $\Delta$ can be determined. Therefore, based on a photodetection result of the shaft portion image sensor 48, the tilting of the optical axis 46a of the first condenser lens 44, that is, the tilting angle of the vertical rotation shaft 36 can be detected.

Since the rotation of the angle detection pattern 47 on the shaft portion image sensor 48 or the displacement amount of the center position of the angle detection pattern 47 can be detected by the unit of pixel of the shaft portion image sensor 48, a highly accurate measurement can be made.

Moreover, together with the rotation angle, the tilting of the vertical rotation shaft 36 can be detected. Based on the tilting as detected, by correcting a measured value, a measurement result in which an influence of the tilting of the vertical rotation shaft 36 is eliminated can be obtained. Therefore, even in a state where the rotation of the vertical rotation shaft 36 includes an error, a highly accurate angle detection can be made. Therefore, a part accuracy and an assembling of the vertical rotation shaft 36 do not have to be highly accurate and a manufacturing cost of the vertical angle detector 16 can be reduced.

In the above-described embodiment, the shaft portion image sensor 48 may be provided on a vertical rotation shaft 36 side, and the angle detection pattern 47 may be provided on a mount 35 side.

Figure 10:
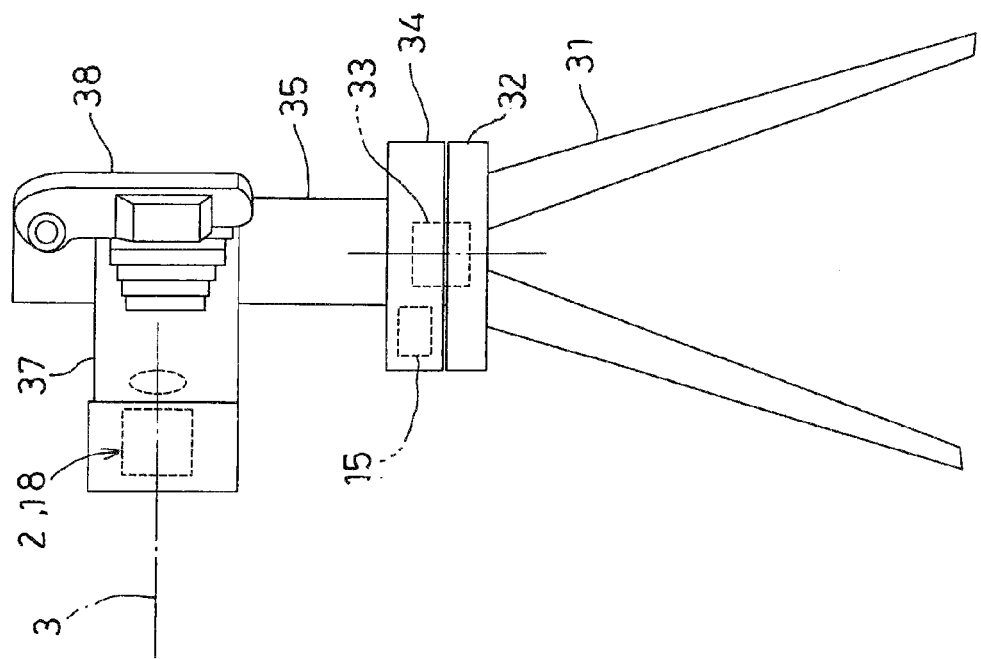
FIG. 10 is a front view of a fourth embodiment.
Figure 11:
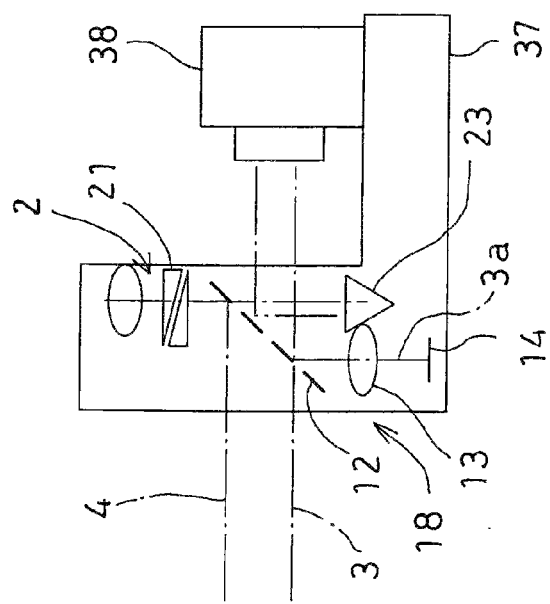
FIG. 11 is a schematical block diagram to show an electro-optical distance measurement instrument and a reference-pattern projection optical system in the fourth embodiment.

FIG. 10 and FIG. 11 illustrate a fourth embodiment. In the fourth embodiment, a commercial digital camera is used as an observation optical system having a zoom optical system, and a total station is configured.

In FIG. 10 and FIG. 11, the same component as shown in FIG. 1 and FIG. 5 to FIG. 7 is referred by the same symbol, and detailed description is not given here.

In the fourth embodiment, an electro-optical distance measurement instrument 2 is provided integrally with a reference-pattern projection optical system 18 on a vertical rotation base 37, an angle measurement can be performed by a commercial digital camera and a distance measurement can be performed by the electro-optical distance measurement instrument 2 and a distance measuring optical axis 4 is deflected by a fine adjustment mechanism 21, thereby a measuring point of the distance measurement concurs with a measuring point of the angle measurement.

Furthermore, as the electro-optical distance measurement instrument 2, a commercial hand held type may be attached. In this case, by combining the commercial digital camera and the commercial hand held type electro-optical distance measurement instrument 2, a total station can be configured easily.

The invention claimed is:

1. A surveying apparatus comprising:
   an observation optical system, wherein said observation optical system has an observation optical axis, and
   an image sensor for outputting a digital image signal,
   a half mirror, and a zoom optical system disposed between said image sensor and said half mirror, wherein said image sensor, said half mirror and said zoom optical system are provided on said observation optical axis,
   a projection optical system, wherein said projection optical system has an optical axis split by said half mirror from said observation optical axis and a reference-pattern projection optical system provided on said optical axis, wherein said reference-pattern projection optical system makes a reference pattern enter said observation optical system via said optical axis, wherein said reference pattern is reflected by said half mirror toward said image sensor in an infinity state and forms an image on said image sensor through said zoom optical system,
   a rotation mechanism capable of rotating said observation optical system and said reference-pattern projection optical system integrally in two directions of horizontal and vertical,
   a horizontal angle detector and a vertical angle detector for detecting a horizontal angle and a vertical angle of rotation in the two directions of said rotation mechanism, and
   an arithmetic control unit, wherein said arithmetic control unit measures the horizontal angle and the vertical angle of a sighting point based on detection results of said horizontal angle detector and said vertical angle detector and based on a difference between said reference pattern on said image sensor and the sighting point of said observation optical system.

2. The surveying apparatus according to claim 1, further comprising an electro-optical distance measurement instrument having a distance measuring optical axis in parallel with an optical axis of said observation optical system, wherein said electro-optical distance measurement instrument measures a distance of a measuring point of an object to be measured.

3. The surveying apparatus according to claim 2, further comprising a fine adjustment mechanism which is provided on said distance measuring optical axis and finely adjusts a deflection of said distance measuring optical axis, wherein said fine adjustment mechanism is configured to make the measuring point of a distance measurement concur with a measuring point of said observation optical system.

4. The surveying apparatus according to any one of claims 1 to 3, wherein said reference pattern is a lattice composed of orthogonal lines and a zoom power is calculated by measuring a line interval of said lattice projected on said image sensor.

5. The surveying apparatus according to any one of claims 1 to 3, wherein said reference pattern is a lattice composed of orthogonal lines, a distortion of an image is calculated by measuring said lattice projected on said image sensor and based on a calculation result, a measurement result is corrected.

6. The surveying apparatus according to any one of claims 1 to 3, wherein said observation optical system is a commercial digital camera.

7. The surveying apparatus according to claim 4, wherein said reference pattern is a lattice composed of orthogonal lines, a distortion of an image is calculated by measuring said lattice projected on said image sensor and based on a calculation result, a measurement result is corrected.

8. The surveying apparatus according to claim 4, wherein said observation optical system is a commercial digital camera.

* * * * *